United States Patent
Yang et al.

(10) Patent No.: US 7,391,775 B2
(45) Date of Patent: Jun. 24, 2008

(54) METHOD AND APPARATUS TO PROVIDE NETWORK DATA RECOVERY OPTIMIZATION WITH HEADER COMPRESSION ENABLED IN UNRELIABLE ENVIRONMENT

(75) Inventors: Fengming Yang, San Diego, CA (US); Tao He, San Diego, CA (US)

(73) Assignee: Nokia Corporation, Espoo (FI)

(*) Notice: Subject to any disclaimer, the term of this patent is extended or adjusted under 35 U.S.C. 154(b) by 773 days.

(21) Appl. No.: 10/818,195

(22) Filed: Apr. 5, 2004

(65) Prior Publication Data

US 2005/0226241 A1  Oct. 13, 2005

(51) Int. Cl.
*H04Q 11/00* (2006.01)
(52) U.S. Cl. .................................................... 370/394
(58) Field of Classification Search .................. 370/389
See application file for complete search history.

(56) References Cited

U.S. PATENT DOCUMENTS

| 2004/0071096 | A1 | 4/2004 | Na et al. ................. 370/252 |
| 2005/0195750 | A1* | 9/2005 | Le et al. ................. 370/252 |
| 2005/0286523 | A1* | 12/2005 | Liao et al. .............. 370/389 |
| 2006/0203797 | A1* | 9/2006 | Abrol et al. ............ 370/349 |

OTHER PUBLICATIONS

TCP Congestion Control, Network Working Group, Request for Comments (RFC) 2581 by M. Allman et al., Apr. 1999.*
"Compressing TCP/IP Headers for Low-Speed Serial Links", V. Jacobson, IETF RFC 1144, Feb. 1990, 45 pages.

* cited by examiner

*Primary Examiner*—Chau Nguyen
*Assistant Examiner*—Louis Bell
(74) *Attorney, Agent, or Firm*—Harrington & Smith, PC

(57) ABSTRACT

Disclosed is a method, a device, such as a mobile station, and an information bearing medium that tangibly embodies a program of machine-readable instructions that are executable by a digital processing apparatus to perform operations to receive data packets. In this case the operations include verifying the correctness of a received data packet; storing a data packet found to have an incorrect TCP layer header checksum and signaling the source of the received data packets and, in response to receiving another instance of a previously received incorrect data packet, verifying the correctness of the received another instance of the data packet and, if correct, using information obtained from verifying the correctness of a header of the received another instance of the data packet to re-verify the correctness of the at least one stored data packet that was previously found to be incorrect. The correctness of the received data packet is preferably verified by use of a PPP layer FCS checksum, an IP layer header checksum and a TCP layer checksum. The data packet headers are preferably compressed by using a V-J header compression technique.

28 Claims, 7 Drawing Sheets

| 0 1 2 3 4 5 6 7 8 9 | 0 1 2 3 4 5 6 7 8 9 | 0 1 2 3 4 5 6 |
|---|---|---|
| SOURCE PORT | | DESTINATION PORT |
| SEQUENCE NUMBER ||| 
| ACKNOWLEDGE NUMBER |||
| TCP HEADER LENGTH | RESERVED | U A P R S F / R C S S Y I / G K H T N N | WINDOW |
| CHECKSUM || URGENT POINT |
| OPTIONS (OPTION TYPE–OPTION LENGTH–OPTION DATA): (MSS; WINDOW SCALE; NAK) || PADDING |
| DATA |||
| DATA |||

TCP FRAME FORMAT

FIG.2
PRIOR ART

FIG. 3
PRIOR ART
IP FRAME FORMAT

| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 |
|---|---|---|---|---|---|---|---|---|---|---|---|---|---|---|---|---|---|---|---|---|---|---|---|---|---|---|
| VERSION | | | | IHL | | | | TYPE OF SERVICE | | | | | | | | TOTAL LENGTH | | | | | | | | | | |
| IDENTIFICATION | | | | | | | | | | | | | | | | DF MF | | FRAGMENT OFFSET | | | | | | | | |
| TIME TO LIVE | | | | | | | | PROTOCOL | | | | | | | | HEADER CHECKSUM | | | | | | | | | | |
| SOURCE ADDRESS | | | | | | | | | | | | | | | | | | | | | | | | | | |
| DESTINATION ADDRESS | | | | | | | | | | | | | | | | | | | | | | | | | | |
| OPTIONS (SECURITY; STRICT/LOOSE SOURCE ROUTING; RECORD ROUTE; TIMESTAMP) | | | | | | | | | | | | | | | | | | | | | | | PADDING | | | |
| DATA | | | | | | | | | | | | | | | | | | | | | | | | | | |
| DATA | | | | | | | | | | | | | | | | | | | | | | | | | | |

FIG. 4
PRIOR ART
PPP FRAME FORMAT

| FIELD | FLAG | ADDRESS | CONTROL | PROTOCOL | INFORMATION | PADDING | FCS |
|---|---|---|---|---|---|---|---|
| LENGTH (BITS) | 8 | 8 | 8 | 8/16 | * | * | 16/32 |
| VALUE | 0 x 7E | 0 x FF | 0 x 03 | | | | |

METHOD AND APPARATUS TO PROVIDE NETWORK DATA RECOVERY OPTIMIZATION WITH HEADER COMPRESSION ENABLED IN UNRELIABLE ENVIRONMENT

TECHNICAL FIELD

This invention relates generally to the transmission of data through a data communications network and, more specifically, relates to Transfer Control Protocol/Internet Protocol (TCP/IP) data packet transmission using header compression, preferably a header compression technique of a type known in the art as V. Jacobson header compression that is described in IETF RFC 1144 "Compressing TCP/IP Headers for Low-Speed Serial Links" (V-J header compression), February 1990.

BACKGROUND

TCP/IP header compression (V-J header compression) is capable of compressing the TCP/IP header from 40 bytes to as few as three to four bytes through a serial connected Point-to-Point Protocol (PPP) link. The use of such header compression technology is typically not an issue with regard to throughput in a media-reliable environment where the data transferred is rarely lost or distorted due to physical interference and other impairments.

However in an unreliable transmission link environment, such as in a wireless data transmission environment, the noise is typically bursty. Consequently, data packet loss is a common occurrence. For example, in first generation wireless code division multiple access (CDMA) a radio link protocol (RLP) is used as the link layer below the PPP layer for data transfer. RLP is a best-effort protocol, and only conducts a few rounds of recovery for lost frames. Furthermore, RLP will deliver corrupted frames to a higher layer if it cannot recover the lost frames.

V-J header compression relies on previously received in-sequence correct packets to restore the information from the compressed TCP/IP header. As a result, if TCP/IP V-J header compression is enabled during CDMA wireless data transfer, a single data packet loss can result in the failure of decoding of all later received data packets. The total size (in bytes) of the later received packets can be up to the entire announced TCP receiver window size. The decoding failure is indicated as an incorrect TCP checksum due to an incorrect restored TCP sequence number in the TCP header part.

Section 4.2 of RFC 1144 is entitled "Error Recovery", and suggests techniques for causing the decompressor to again begin generating valid packets after an occurrence of a CRC error.

At present, those data packets with an incorrect TCP checksum (although the data payload is still correct) are discarded quietly. Also, since the data packets are discarded quietly by the receiver, no TCP acknowledgment (ACK) packets are sent back to trigger the peer TCP (i.e. the data sender) fast retransmission/recovery algorithm. This problem results in wasting the air channel resource and also in a lower data transfer throughput.

FIG. 1 shows a typical TCP/IP/PPP protocol stack implementation. Assume that there exists a block of user data 1 that is required to be delivered to a peer application. The user data 1 is first delivered to the TCP layer 2. The TCP layer 2 may segment the block of user data 1 into several segments. For each segment, the TCP layer 2 puts the data in the payload of a frame, and wraps it with a TCP header 2A into a TCP frame. FIG. 2 shows a conventional TCP frame format, which has a 16-bit checksum part in the header part. Next, the TCP layer 2 delivers the entire TCP frame to the IP layer 3. The IP layer 3 considers the entire TCP frame as data, and places it into the payload part of a frame, adds an IP header 3A, and thus generates an IP frame. FIG. 3 shows a conventional IP frame format, which has a 16-bit header checksum. The IP frame is then delivered to the PPP layer 4 and placed into a PPP payload part and wrapped into a PPP frame having a PPP header 4A. FIG. 4 shows a conventional PPP frame format, which has a 16-bit frame-check-sequence (FCS, which is a 16-bit CRC check). The PPP frame is delivered to a lower layer to be passed to the peer. For example, in a first generation wireless CDMA system the lower layer is the RLP layer and an IS2000/IS-95 physical layer.

From FIGS. 2 and 3 it can be seen that the IP header and the TCP header both consist of 20 bytes. If the V-J header compression is enabled, the 40 total bytes of TCP/IP headers can be compressed into about three (one byte of flag bits and two bytes of TCP checksum) to four bytes to transfer only the difference between the frames.

In a wireless environment, the data transfer may often proceed in the following exemplary manner:

| Frame # | | | | | | |
|---|---|---|---|---|---|---|
| 1 | 2 | 3 | 4 | 5 | 6 | 7 |
| X | X | Y | Z | Z | Z | Z | where:
X indicates a received good and in-sequence frame;
Y indicates a corrupted PPP frame due to RLP layer data loss or corruption; and
Z indicates a received out-of-sequence frame.

For the corrupted Y frame #3, some bytes (or bits) in the frame may be either lost or altered, resulting in the frame usually not passing the PPP FCS check. As a result, this frame will be discarded in the PPP layer.

With V-J header compression turned off, the Z frames (frames 4, 5, 6 and 7) will have a good PPP layer FCS, a good IP header check sum and TCP check sum. Each time it receives a Z frame, the TCP receiver will store the frame in a buffer. It will also send a TCP ACK package back to the data sender for informing the sender that it has received all the data packets up to packet number 3. For example, when the data receiver receives four Z frames, such as frames 4, 5, 6 and 7, it will send four TCP ACK frames back to the data sender, all with the same acknowledgment number of packet #2. When the data sender receives three or more consecutive TCP ACK frames acknowledging the same packet number 2, it will immediately know that packet number 3 is lost. The data sender will then immediately re-transmit data packet number 3 and only re-transmit packet number 3. When the data receiver receives the corrupted frame #3, it sends a TCP ACK to acknowledge all of the data up to frame #7. Consequently, all of the Z frames are useful. This is referred to as the TCP fast-retransmission and fast-recovery algorithm, as defined in RFC 2581. Nearly all TCP protocol stacks have this algorithm implemented.

Considering now the case where V-J header compression is turned on (enabled), the frames #4, 5, 6 and 7 will still all have good PPP layer frame check sums (FCS), and are passed to the IP layer. In the IP layer, since all packets for one TCP connection have the same IP header information, the IP header can be successfully restored, and the IP header check is also correct. As a result, the data can be passed to TCP layer. However, since frame #3 was lost, and since the TCP layer relies on the in-sequence frames to decode the TCP sequence number, all of the Z frames will exhibit a bad TCP layer header, which results to an erroneous TCP checksum. These Z frames are thus discarded immediately. Consequently, although the Z frames all contain good data, they are assumed to be bad because of the failure to correctly restore the TCP headers and are thus not used. Furthermore, there is no TCP ACK frame sent back to the data sender, and the TCP fast-retransmission and fast-recovery algorithm is not triggered. In this case the data sender is required to re-transmit all of the frames 4, 5, 6 and 7 by relying on its re-transmission timer timing out, which can result in a considerable delay before the re-transmission occurs. During this delay period no data is transmitted, resulting in a reduced data transfer throughput.

It can thus be appreciated that when a TCP/IP packet is lost due to V-J header compression being turned on, the resulting indication is that the TCP checksum is incorrect for the remainder of the TCP window segments. As a result, the TCP layer 2 quietly discards the packets that have incorrect checksum, thereby wasting the network channel capacity. As the conservation of channel bandwidth is an important consideration in wireless communications systems, such as modern cellular-type communications systems, this problem results in a number of disadvantages for both the users and the network operators.

SUMMARY OF THE PREFERRED EMBODIMENTS

The foregoing and other problems are overcome, and other advantages are realized, in accordance with the presently preferred embodiments of these teachings.

This invention provides a method, a device, such as a mobile station, and an information bearing medium that tangibly embodies a program of machine-readable instructions that are executable by a digital processing apparatus to perform operations to receive data packets. In this case the operations include: verifying the correctness of a received data packet; storing a data packet found to have an incorrect TCP layer header checksum and signaling the source of the received data packets and, in response to receiving another instance of a previously received incorrect data packet, verifying the correctness of the received another instance of the data packet and, if correct, using information obtained from verifying the correctness of a header of the received another instance of the data packet to re-verify the correctness of the at least one stored data packet that was previously found to be incorrect. The correctness of the received data packet is preferably verified by use of a PPP layer FCS checksum, an IP layer header checksum and a TCP layer checksum. The data packet headers are preferably compressed by using a V-J header compression technique.

In response to re-verifying the correctness of at least one stored data packet, the operations further include sending an acknowledgment to the source of the received data packets to verify that the data packets are received out of sequence to trigger the data sender's fast retransmission and fast recovery algorithm.

In one preferred, although not limiting, embodiment of this invention the digital processing apparatus forms a part of a mobile station, and the data packets are TCP/IP/PPP data packets that are received through a wireless channel.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 2 illustrates a conventional TCP frame format;

FIG. 3 illustrates a conventional IP frame format;

FIG. 4 illustrates a conventional PPP frame format;

DETAILED DESCRIPTION OF THE PREFERRED EMBODIMENTS

The disclosure of IETF RFC 1144 "Compressing TCP/IP Headers for Low-Speed Serial Links" (V-J header compression), February 1990 is incorporated by reference herein.

Figure 7:
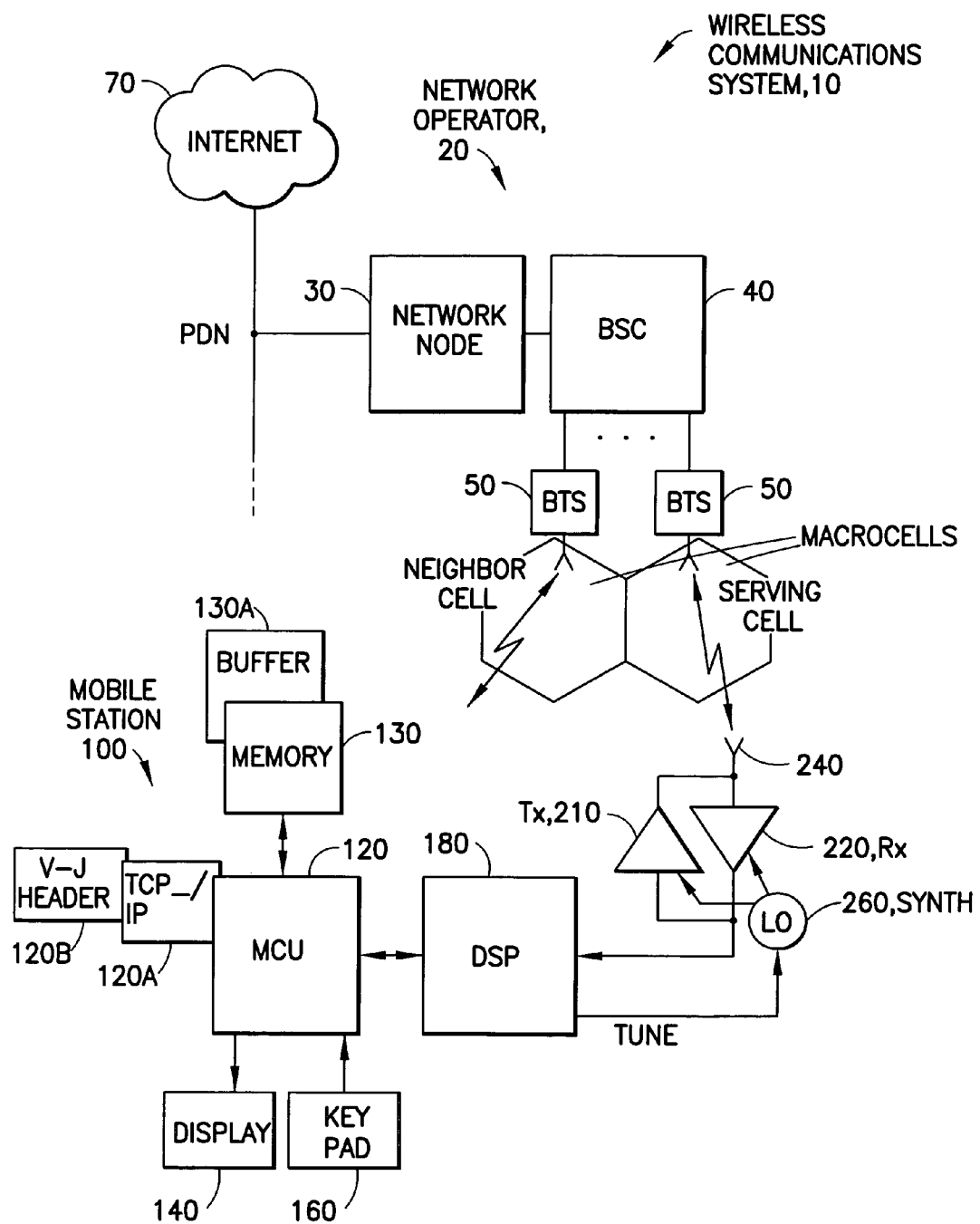
FIG. 7 is a simplified block diagram of a wireless communications system that includes a mobile station that is suitable for practicing this invention.

By way of introduction, and referring to FIG. 7, there is shown as a simplified block diagram an embodiment of a wireless communications system 10 that is suitable for practicing this invention. The wireless communications system 10 includes at least one mobile station (MS)100. FIG. 7 also shows an exemplary network operator 20 having, for example, a node 30 for connecting to a telecommunications network, such as a Public Packet Data Network or PDN, at least one base station controller (BSC) 40 or equivalent apparatus, and a plurality of base transceiver stations (BTS) 50, also referred to as base stations (BSs), that transmit in a forward or downlink direction both physical and logical channels to the mobile station 100 in accordance with a predetermined air interface standard. A reverse or uplink communication path also exists from the mobile station 100 to the network operator, which conveys mobile originated access requests and traffic. A cell is associated with each BTS 50, where one cell will at any given time be considered to be a serving cell, while an adjacent cell(s) will be considered to be a neighbor cell. Smaller cells (e.g., picocells) may also be available.

The air interface standard can conform to any suitable standard or protocol, and may enable both voice and data traffic, such as data traffic enabling Internet 70 access and web page downloads. In the presently preferred embodiment of this invention the air interface standard is compatible with a code division multiple access (CDMA) air interface standard, such as one known as cdma2000, although this is not a limitation upon the practice of this invention.

The mobile station 100 typically includes a control unit or control logic, such as a microcontrol unit (MCU) 120 having an output coupled to an input of a display 140 and an input coupled to an output of a keyboard or keypad 160. The mobile station 100 may be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a non-volatile memory for storing an operating program and other information, as well as a volatile memory for temporarily storing required data, scratchpad memory, received packet data, packet data to be transmitted, and the like. A portion of the memory 130 forms a packet buffer 130A for buffering received packets with an incorrect TCP checksum, as will be discussed in further detail below. The operating program is assumed, for the purposes of this invention, to enable the MCU 120 to execute the software routines, layers and protocols required to implement the methods in accordance with this invention. For example, the operating program is assumed to be operable for implementing the TCP, IP and PPP layers and protocols as indicated in FIGS. 1-4, as well as for implementing at least a decompression algorithm for decompressing received V-J header compressed packets. As such, the MCU 120 is shown for convenience as including a TCP/IP function 120A, and a header compression/decompression function, such as a V-J header functional block 120B. The operating program typically also provides a suitable user interface (UI), via display 140 and keypad 160, with a user. Although not shown, a microphone and speaker are typically provided for enabling the user to conduct voice calls in a conventional manner.

In general, at least a portion of the memory 130 may be considered to be an information bearing medium that tangibly embodies a program of machine-readable instructions that are executable by a digital processing apparatus, in this case the MCU 120, to perform operations to receive data packets in accordance with this invention.

The mobile station 100 also contains a wireless section that includes a digital signal processor (DSP) 180, or equivalent high speed processor or logic, as well as a wireless transceiver that includes a transmitter 200 and a receiver 220, both of which are coupled to an antenna 240 for communication with the network operator. At least one local oscillator, such as a frequency synthesizer (SYNTH) 260, is provided for tuning the transceiver. Data, such as digitized voice and packet data, is transmitted and received through the antenna 240.

In accordance with this invention, each time the TCP/IP function 120A receives a packet with an incorrect TCP checksum, the TCP layer 2 sends a TCP ACK packet back to the peer TCP to acknowledge the current expected data packet (RCV→NXT). This triggers the peer TCP's fast retransmission mechanism. In addition, instead of quietly discarding those packets having an incorrect checksum, the TCP/IP function 120A stores those packets having the incorrect TCP checksum in the packet buffer 130A. Subsequently, when the TCP/IP function 120A receives the expected correct packet (RCV→NXT), the TCP/IP function 120A uses the current receive pointer to check the header checksum of the packet(s) buffered in the packet buffer 130A. If the checksum of the buffered TCP/IP packets is correct, the TCP/IP function 120A then uses these packets in a normal manner as correctly received TCP/IP packets. It also sends an ACK package back to the sender to acknowledge all current received correct data to facilitate rapid recovery from the error condition.

Figure 8:
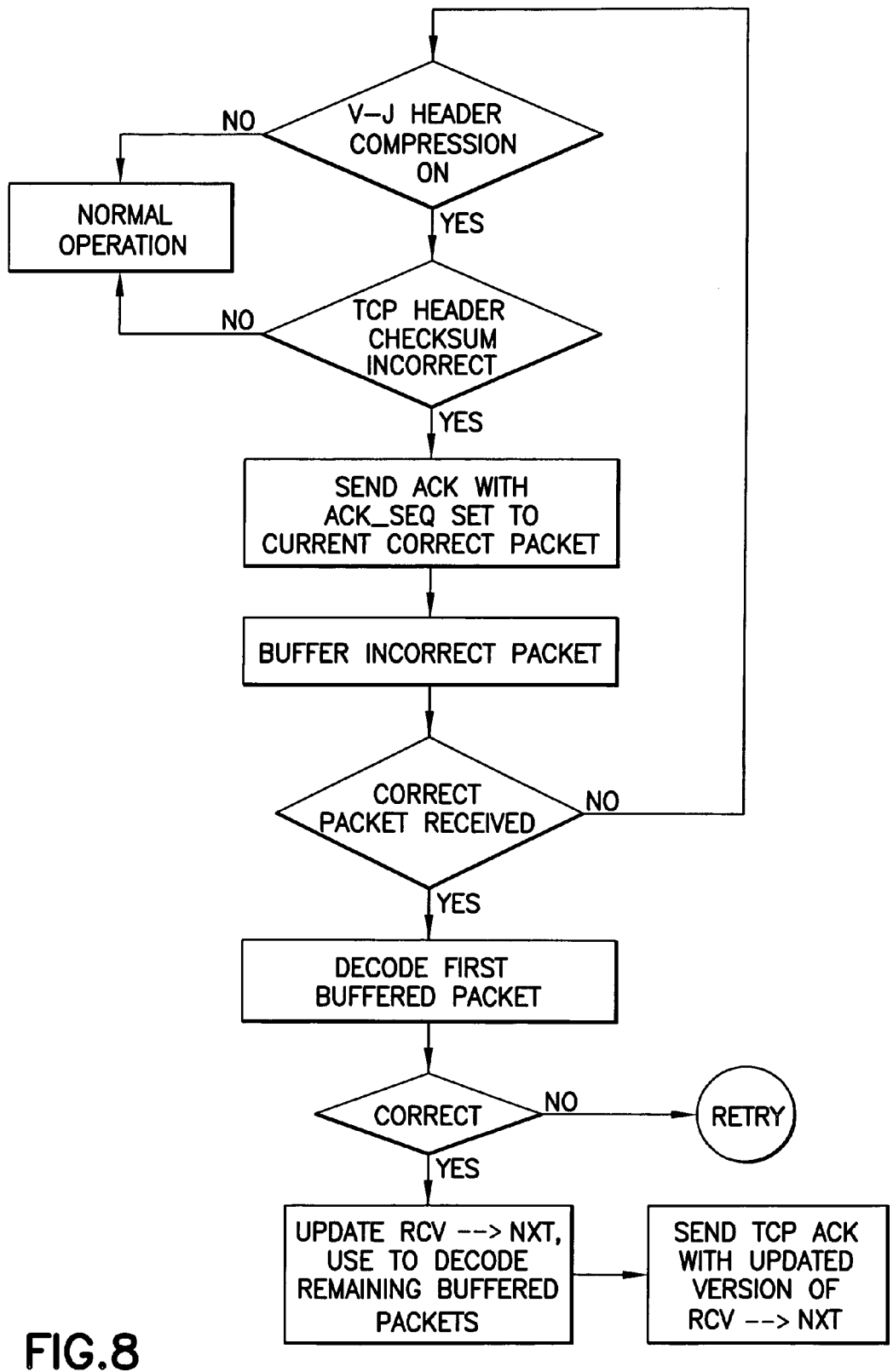
FIG. 8 is a logic flow diagram that depicts the operation of a TCP/IP function that forms a part of the mobile station of FIG. 7.

An exemplary and non-limiting pseudo-code implementation that is descriptive of the operation of the TCP/IP function 120A, in combination with the V-J header function 120B and the packet buffer 130A, is as follows (reference is also made to the logic flow diagram of FIG. 8, and note that the implementation of the invention need only modify the TCP data receiving part):

```
DO {
    IF (V-J header compression on) AND (TCP check sum is
    incorrect for this packet)
        {
        TCP function 120A sends an ACK packet immedi-
            ately to the sender with the ack_seq set to the
            current correctly received pointer RCV->NXT
        TCP/IP function 120A buffers the packet with the
            incorrect checksum in the packet buffer 130A.
        }
    } WHILE ( each subsequent received packet has an
        incorrect TCP checksum)
IF (the correct TCP packet (RCV-->NXT) is received) (*note)
{
        RCV-->NXT is modified. Use the current
        RCV-->NXT pointer to update the TCP sequence
            number of the first packet buffered and then re-
            calculate the TCP checksum of the
            buffered TCP packet.
        IF (the buffered packet TCP checksum is decoded
            correctly after recalculation)
            Use the decoded packet as a correct TCP/IP
                packet, update RCV-->NXT pointer,
            Use the updated RCV-->NXT pointer to
                decode the remainder of the
                buffered TCP/IP packets.
}
TCP/IP function 120A sends a TCP ACK packet back to the peer
    TCP to inform the value of the current RCV-->NXT pointer.
Discard the remainder of the buffered packets
    and clean the buffer.
```

Note:
Because TCP is a connect-oriented reliable data transfer protocol, the expected RCV-->NXT should eventually be received, otherwise the data/file transfer should be aborted.

Figure 1:
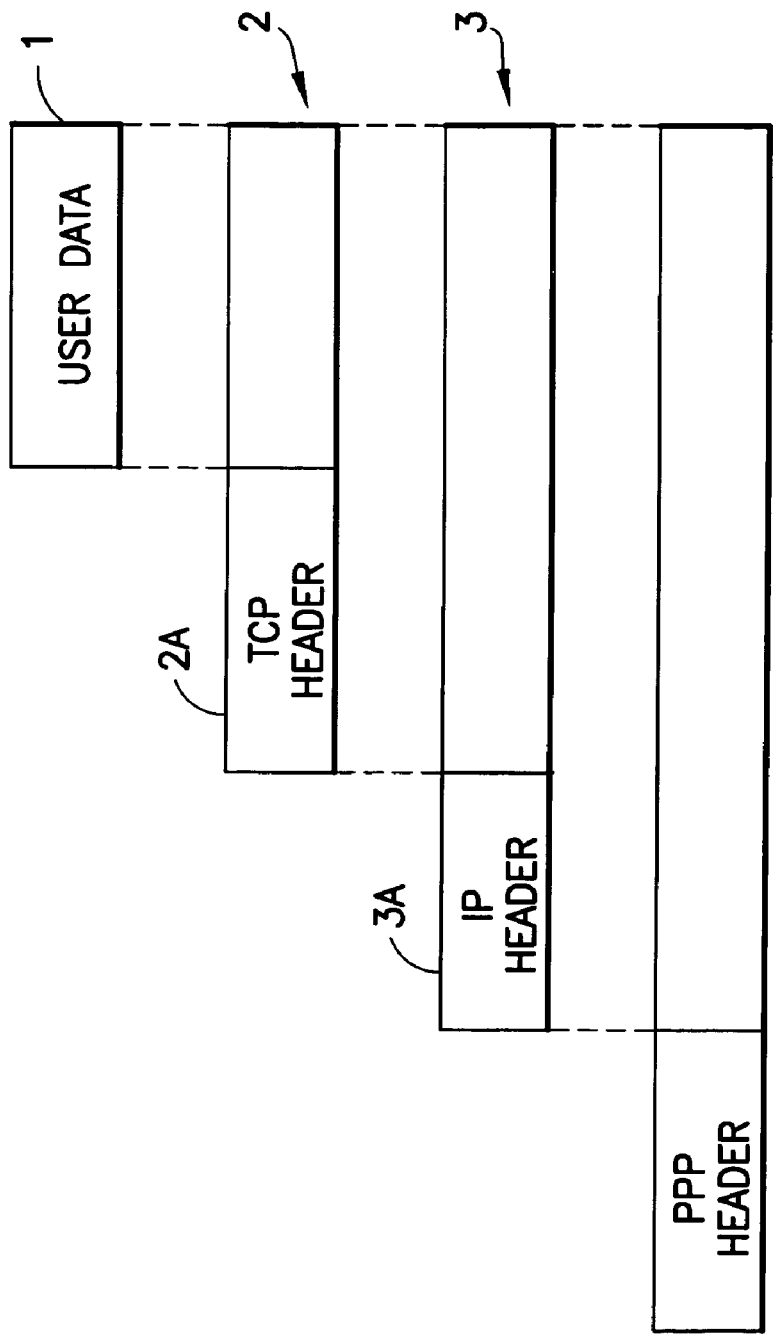
FIG. 1 illustrates a typical and conventional TCP/IP/PPP protocol stack architect.
Figure 5:
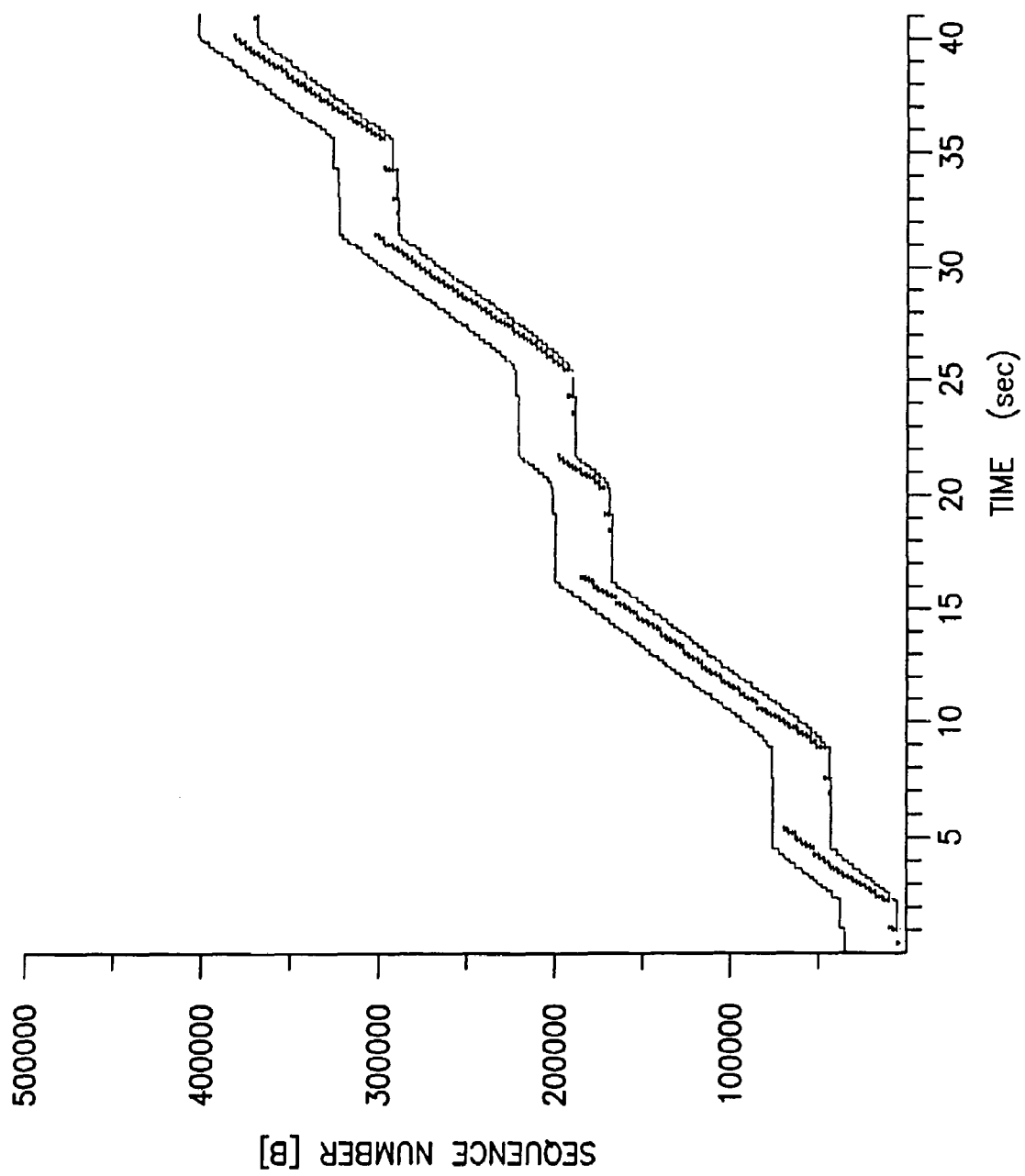
FIG. 5 illustrates a data transfer time/sequence graph of conventional TCP transmission for FTP uploading with data burst errors and header compression enabled.
Figure 6:
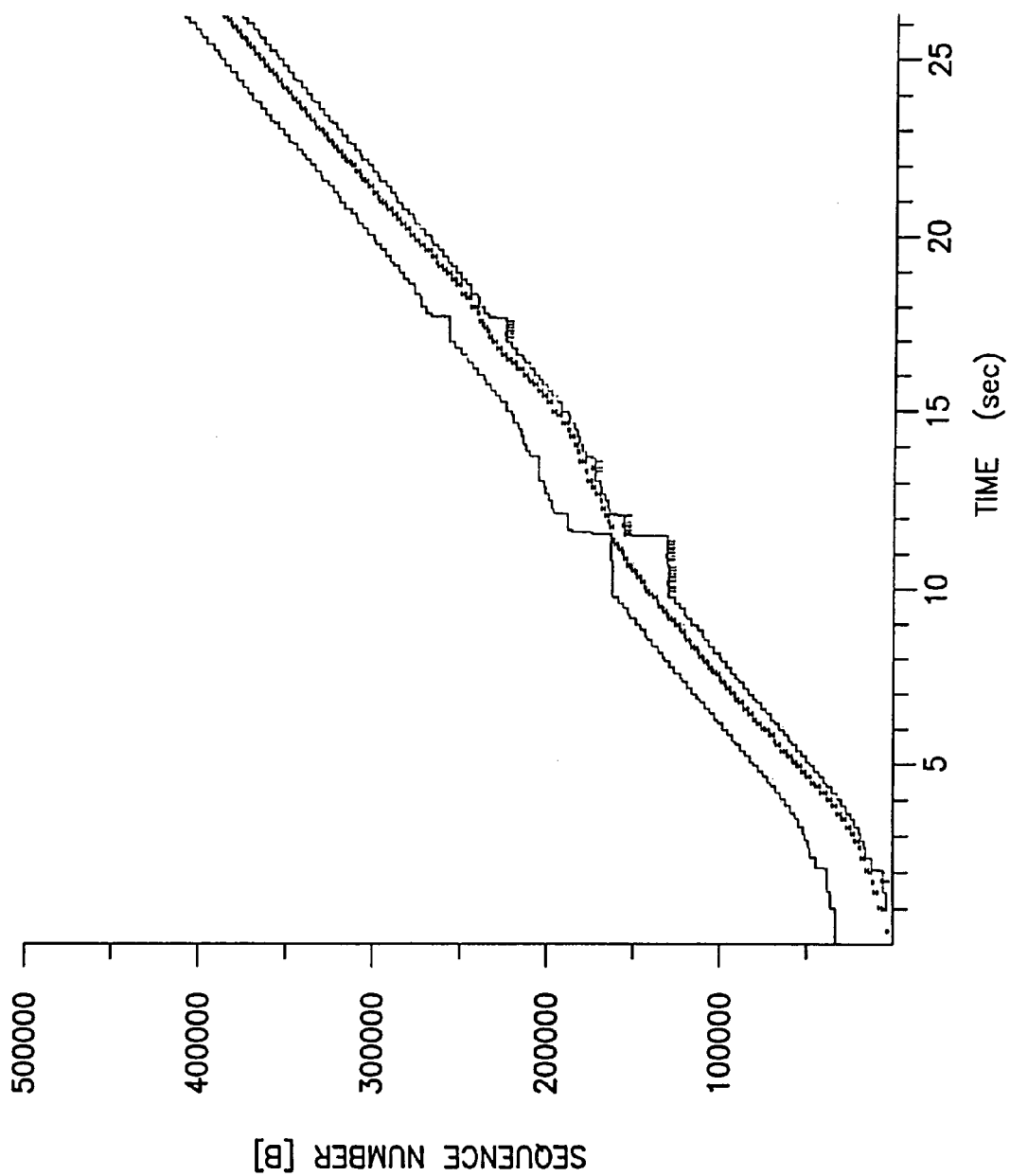
FIG. 6 illustrates a data transfer time/sequence graph of TCP transmission for FTP uploading with data burst errors and header compression enabled, in accordance with this invention.

FIG. 5 illustrates a data transfer time/sequence graph of conventional TCP transmission for FTP uploading with some data burst errors and header compression enabled. The X-axis represents the time in seconds and the Y-axis represents the relative TCP sequence number in bytes. The center solid line represents the real data being transferred, while the upper thin line is the TCP announced window limit corresponding to some specific time. The lower thin line is the moment the TCP ACK received. The data-burst errors occur at about 5 seconds, 16 seconds, 21 seconds, 31 seconds and 41 seconds on the X-axis. It can be seen that each time an error occurs, the TCP has to retransmit all of the data packets that were already transmitted after the error happens. This prior art Figure can be contrasted with FIG. 6, which illustrates a data transfer time/sequence graph of TCP transmission for FTP uploading (to the MS 100) with data burst errors and with header compression enabled, but in accordance with this invention. Note that the benefits of this invention can also be obtained with header compression disabled. The data-burst errors occur at about 1.8 seconds, 10 seconds, 11 seconds, 12 seconds, 14 seconds, 17 seconds, 30 seconds and 31 seconds on the X-axis. In this case it can be observed that each time an error occurs, the TCP only needs to retransmit the lost data packet. This results in a much reduced transfer time and much higher throughput. One can thus note the substantial improvement in data packet throughput by the use of this invention.

The foregoing procedure enables the TCP fast retransmission/recovery procedure to operate with V-J header compression turned on. The foregoing procedure also improves the data throughput in CDMA wireless and other inherently unreliable data transmission environments (e.g., in a data transmission environment that employs a transmission channel that is subject to burst and impulse noise, and other channel impairments).

While during execution of the foregoing procedure the TCP/IP function 120A will tend to send more TCP ACK packets than would normally be sent, however since the majority of the data transfer is usually one way (e.g., at any given time the MS 100 is either downloading or uploading), it is not a serious impact on the overall amount of traffic to use the less busy channel (e.g., the uplink channel when downloading packets to the MS 100 on the downlink channel) to send the additional TCP ACK packets back to the peer TCP. In addition, the TCP/IP function 120A may piggy back an ACK message onto another message if a simultaneous transfer is ongoing.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the invention described above may be used in any type of device or product that uses socket server code such as, but not limited to, browser, Java™, and network layer High Speed Data (HSD) applications. Further, the use of similar or equivalent algorithms, header compression techniques and network protocols may be attempted by those skilled in the art. Also, while described above primarily in the context of a mobile station, it should be realized that the teachings of this invention can be practiced as well using fixed network and other wireless and wired infrastructure equipment and devices, and applies in general to any device that receives data packets through a channel that is subject to channel impairments. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. An information bearing medium tangibly embodying a program of machine-readable instructions that are executable by a digital processing apparatus to perform operations to receive data packets, the operations comprising:
   verifying the correctness of a received data packet;
   storing a data packet found to have an incorrect transfer control protocol layer checksum and signaling a source of the received data packets; and
   in response to receiving another instance of a previously received incorrect data packet, verifying the correctness of the received another instance of the data packet and, if correct, using information obtained from verifying the correctness of a header of the received another instance of the data packet to re-verify the correctness of at least one stored data packet that was previously found to be incorrect.

2. An information bearing medium as in claim 1, where the correctness of the received data packet is verified by a point-to-point protocol layer frame-check-sequence checksum, internet protocol layer header checksum and transfer control protocol layer checksum.

3. An information bearing medium as in claim 1, where the correctness of the header is verified by obtaining a transfer control protocol layer checksum.

4. An information bearing medium as in claim 1, where data packet headers are compressed.

5. An information bearing medium as in claim 1, where data packet headers are compressed using a V-J header compression technique.

6. An information bearing medium as in claim 1, further comprising, in response to re-verifying the correctness of at least one stored data packet, sending an acknowledgment to the source of the received data packets to verify that the data packets are received correctly, including the at least one stored data packet.

7. An information bearing medium as in claim 1, where said digital processing apparatus forms a part of a mobile station, and where the data packets are transfer control protocol/internet protocol/point-to-point protocol data packets that are received through a wireless channel.

8. A method comprising:
   verifying the correctness of a received data packet;
   storing a data packet found to have an incorrect transfer control protocol layer checksum and signaling a source of the received data packets; and
   in response to receiving another instance of a previously received incorrect data packet, verifying the correctness of the received another instance of the data packet and, if correct, using information obtained from verifying the correctness of a header of the received another instance of the data packet to re-verify the correctness of at least one stored data packet that was previously found to be incorrect.

9. A method as in claim 8, where the correctness of the received data packet is verified by a point-to-point protocol layer frame-check-sequence checksum, internet protocol layer header checksum and transfer control protocol layer checksum.

10. A method as in claim 8, where the correctness of the header is verified by obtaining a transfer control protocol layer checksum.

11. A method as in claim 8, where the data packet headers are compressed.

12. A method as in claim 8, where the data packet headers are compressed using a V-J header compression technique.

13. A method as in claim 8, further comprising, in response to re-verifying the correctness of at least one stored data packet, sending an acknowledgment to the source of the received data packets to verify that the data packets are received correctly, including the at least one stored data packet.

14. A method as in claim 8, where said method is executed by a digital processing apparatus that forms a part of a mobile station, and where the data packets are transfer control protocol/internet protocol/point-to-point protocol data packets that are received through a wireless channel.

15. A device that comprises an interface to receive data packets through a channel, further comprising a data processor and a memory that cooperate to verify the correctness of a received data packet; to store a data packet found to be incorrect and to signal a source of the received data packets and, in response to receiving another instance of a previously received incorrect data packet, to verify the correctness of the received another instance of the data packet and, if correct, to use information obtained from verifying the correctness of a header of the received another instance of the data packet to re-verify the correctness of at least one stored data packet that was previously found to be incorrect.

16. A device as in claim 15, where the correctness of the received data packet is verified by use of a point-to-point protocol layer frame-check-sequence checksum, internet protocol layer header checksum and transfer control protocol layer checksum.

17. A device as in claim 15, where the correctness of the header is verified by obtaining a transfer control protocol layer checksum.

18. A device as in claim 15, where the data packet headers are compressed.

19. A device as in claim 15, where the data packet headers are compressed using a V-J header compression technique.

20. A device as in claim 15, further comprising, in response to re-verifying the correctness of at least one stored data packet, sending an acknowledgment to the source of the received data packets to verify that the data packets are received correctly, including the at least one stored data packet.

21. A device as in claim 15, where said device comprises a mobile station, and where the data packets are transfer control protocol/internet protocol/point-to-point protocol data packets that are received through a wireless channel.

22. An apparatus comprising:
means for receiving data packets through a channel;
means for verifying the correctness of a received data packet;
means for storing a data packet found to be incorrect; and
means for signaling a source of the received data packets,
said verifying means responsive to receiving another instance of a previously received incorrect data packet for verifying the correctness of the received another instance of the data packet and, if correct, for using information obtained from verifying the correctness of a header of the received another instance of the data packet for re-verifying the correctness of at least one stored data packet previously found to be incorrect.

23. An apparatus as in claim 22, where the correctness of the received data packet is verified by use of a point-to-point protocol layer frame-check-sequence checksum, internet protocol layer header checksum and transfer control protocol layer checksum.

24. An apparatus as in claim 22, where the correctness of the header is verified by obtaining a transfer control protocol layer checksum.

25. An apparatus as in claim 22, where a data packet header is compressed.

26. An apparatus as in claim 22, where a data packet header is compressed using a V-J header compression technique.

27. An apparatus as in claim 22, further comprising means, responsive to a re-verification of the correctness of at least one stored data packet, for sending an acknowledgment to the source of the received data packets to verify that data packets are received correctly, including the at least one stored data packet previously found to be incorrect.

28. An apparatus as in claim 22 embodied as a mobile station, where data packets comprise transfer control protocol/internet protocol/point-to-point protocol data packets received through a wireless channel.

* * * * *